Feb. 5, 1929.
H. W. BELL
1,701,061
FLEXIBLE COUPLING
Filed July 23, 1923    3 Sheets-Sheet 1
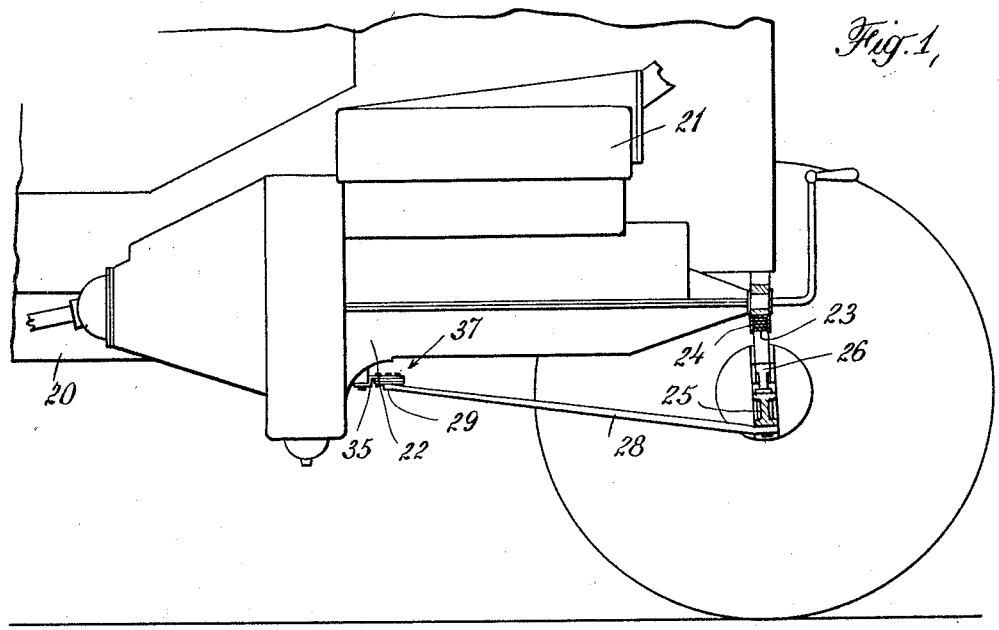
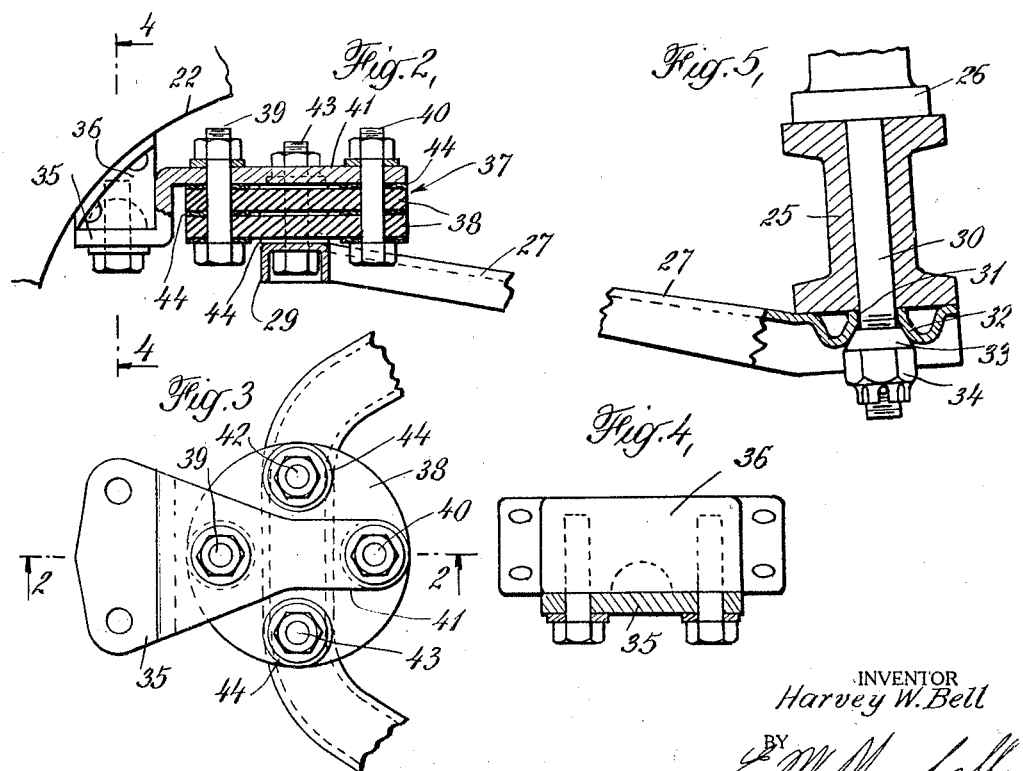
INVENTOR
*Harvey W. Bell*
BY
*E. M. Marshall*
ATTORNEY

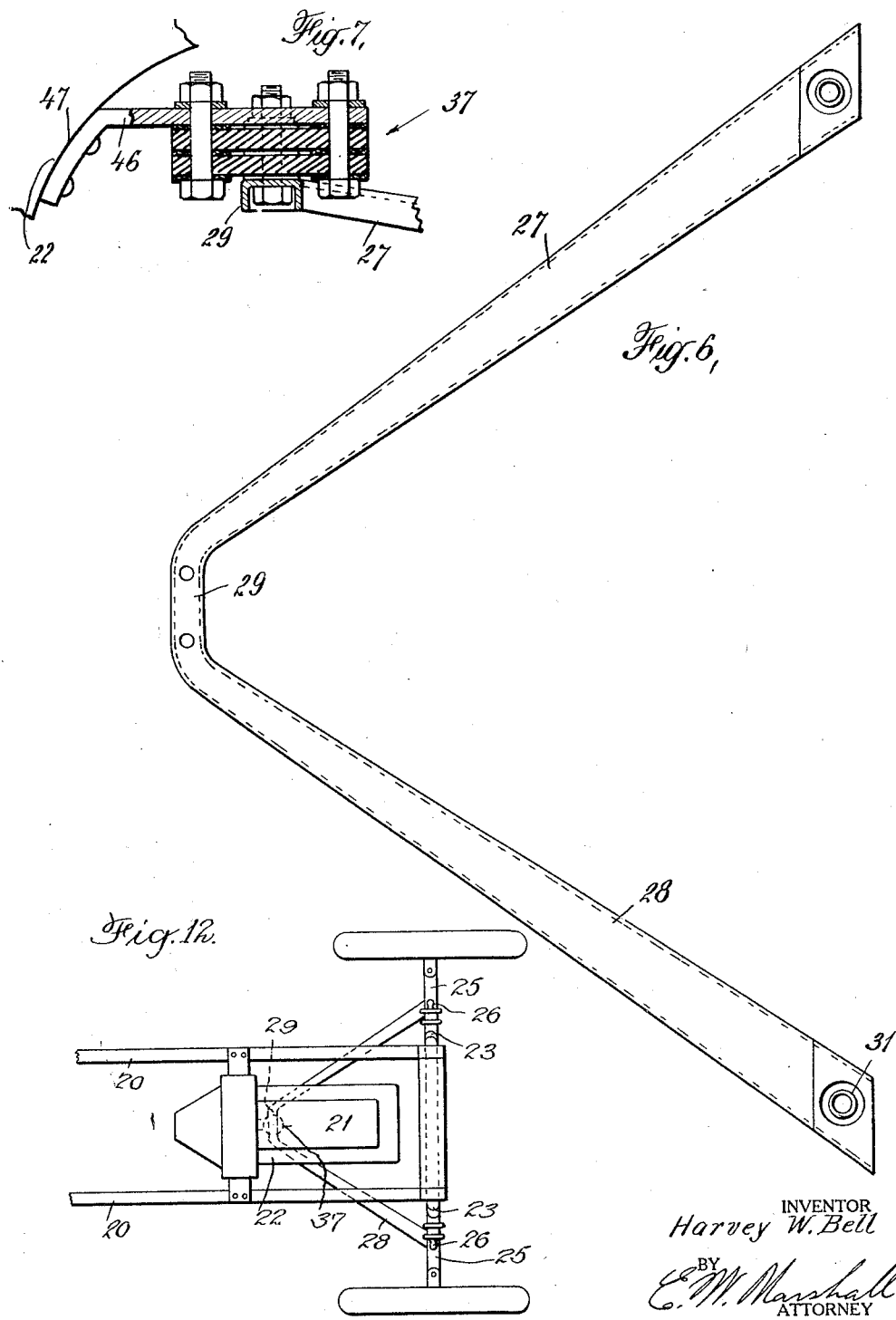

Feb. 5, 1929.
H. W. BELL
FLEXIBLE COUPLING
Filed July 23, 1923
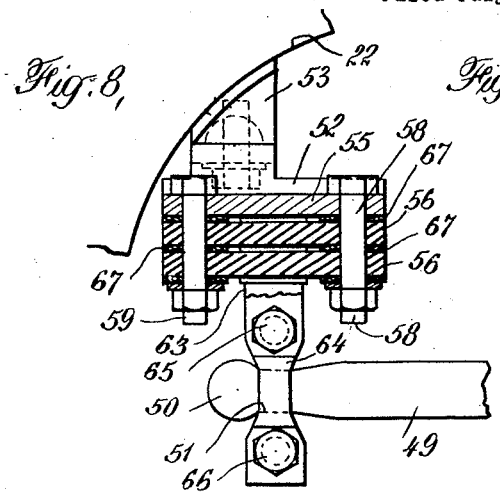
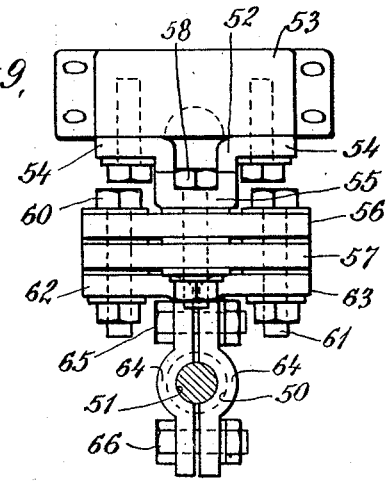
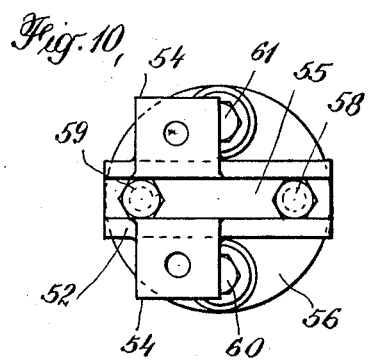
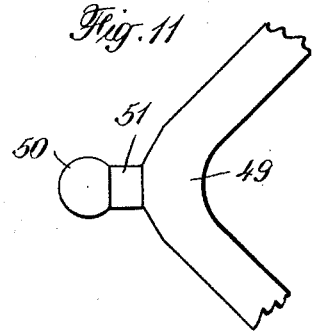
INVENTOR
Harvey W. Bell
BY E. W. Marshall
ATTORNEY Patented Feb. 5, 1929.

1,701,061

UNITED STATES PATENT OFFICE.

HARVEY W. BELL, OF ARDSLEY-ON-THE-HUDSON, NEW YORK, ASSIGNOR TO THE BELOYT CORPORATION, OF DOVER, DELAWARE, A CORPORATION OF DELAWARE.

FLEXIBLE COUPLING.

Application filed July 23, 1923. Serial No. 653,061.

This invention relates to flexible couplings or connections and particularly to devices for use in connecting parts of a motor vehicle or vehicle chassis where it is desirable to provide for a limited relative movement between the connected parts.

The invention has been particularly developed for the purpose of providing a coupling between a vehicle radius rod and the frame of the vehicle and the salient object of the invention is to provide a coupling that will be noiseless, will require no lubrication and will permit the required amount of relative movement between the parts connected.

Furthr objects of the invention will appear from the following specification taken in connection with the drawings which form a part of this application and in which, Fig. 1 is an elevational view, partly in section, of the front end of a motor vehicle showing the coupling connecting the vehicle radius rod and a stationary part of the vehicle.

Fig. 2 is an enlarged sectional elevation of the flexible connection shown in Fig. 1 and taken substantially on line 2—2 of Fig. 3.

Fig. 3 is a top plan view of the structure shown in Fig. 2.

Fig. 4 is a transverse sectional elevation taken substantially on line 4—4 of Fig. 2.

Fig. 5 is an enlarged sectional elevation showing the connection between the front end of one end portion of the radius rod and the vehicle axle.

Fig. 6 is a top plan view of the radius rod structure.

Fig. 7 is a sectional elevation similar to Fig. 2, showing another form of bracket connected to the frame and to the flexible coupling.

Fig. 8 is a sectional elevation similar to Fig. 2 but showing another means for connecting the rear end of the radius rod and the flexible coupling.

Fig. 9 is a front elevation of the structure shown in Fig. 8, the radius rod being shown in section.

Fig. 10 is a top plan view of the structure shown in Fig. 8.

Fig. 11 is a plan view of the rear end of the radius rod structure illustrated in Fig. 8, and Figure 12 is a plan view of the forward end of the vehicle frame and associated parts.

The invention briefly described consists of a coupling particularly developed for connecting the rear end of a radius rod to a part rigidly carried by the frame. The radius rod in connection with which the coupling was designed is V-shaped or is commonly known as the wish bone type. The front ends of this radius rod are connected to the vehicle axle and the rear end or the point of the V is connected by the flexible coupling to a part rigidly carried by the frame. The coupling comprises a plurality of links or discs rigidly clamped at diametrically opposite points to a bracket which is connected to the frame part and rigidly clamped at points to the radius rod. This coupling permits the desired amount of relative movement between the rear end of the radius rod and the frame and because of the structure of the coupling the relative movement is noiseless and no lubrication of the connection is required. The coupling discs are preferably formed of rubberized fabric material or rubberized fabric belting.

Referring to the drawings, Fig. 1 illustrates the front end portion of a motor vehicle having a frame 20, a motor 21 and a crank case 22 housing the motor and enclosing the clutch. The vehicle particularly described has a transverse front spring 23 connected between the transverse front frame member 24 and the front axle 25, the spring bracket being shown at 26.

The radius rod structure is connected between the part rigidly caried by the frame and the front axle and in the particular form of the invention shown the radius rod consists of a V-shaped member having laterally extending portions 27 and 28 and an intermediate portion 29.

The front ends of the portions 27 and 28 are connected to the axle in the manner shown particularly in Fig. 5 by a bolt 30 extending through the axle and carried by the spring bracket 26. The openings 31 through which the bolts 30 extend are flared or cone-shaped as shown at 32 and a conical collar 33 is placed on the bolt 30 and engages the portion 32. A nut 34 retains the collar in position and securely clamps the front end of the radius rod to the axle.

In the embodiment of the invention shown in Figs. 1–5 inclusive a bracket 35 is secured to a lug 36 formed on the crank case 22.

The flexible coupling 37 is clamped to the bracket 35 and to the intermediate portion 29 of the radius rod. This coupling comprises a pair of discs 38 formed of rubberized fabric material and rigidly clamped at diametrically opposite points by bolts 39 and 40 to the portion 41 of the bracket 35.

The intermediate portion 29 of the radius rod is rigidly secured by bolts 42 and 43 to the discs 38 at points intermediate the bolts 39 and 40.

Washers 44 are interposed between the discs 37 and 38 and between the heads of the bolts and the outer disc. The washers 44 are preferably corrugated to increase the gripping action of the clamp.

From the foregoing description it will be evident that a certain amount of relative or pivotal movement is permitted between the radius rod and the vehicle frame or bracket 35 carried by the frame. Although such movement in directions transverse to the coupling is permitted the coupling is strongly resistant to flexure in the plane thereof.

The structure shown in Fig. 7 is substantially the same as that illustrated in the embodiment shown in Figs. 1–5 inclusive and differs therefrom only in the connection between the bracket 46 and the crank case 22. In this case the connection is made by welding these parts together as shown at 47.

In Figs. 8, 9, 10 and 11 another embodiment of the invention is illustrated, the clamp illustrated in these views being designed particularly for connecting the standard wish bone type of radius rod to the vehicle frame. In this type of radius rod the connecting portion 49 has formed on its rear end a ball 50. A reduced portion 51 is formed intermediate the ball 50 and the portion 49 of the radius rod.

The coupling in this embodiment is connected to a bracket 52 bolted to a lug 53 formed on the engine crank case 22. The bracket 52 has its ends 54 bolted to the lug 53 and has a depressed intermediate portion 55. The portion 55 is rigidly secured to a plurality of discs 56 and 57 of flexible material, this connection being made by bolts 58 and 59 extending through the discs and through the intermediate portion 55 of the bracket 52.

The coupling is connected intermediate the bolts 58 and 59 by bolts 60 and 61 to L-shaped clamps 62 and 63. Each of these clamps has formed therein intermediate its ends a half box 64 adapted to receive the reduced portion 51 of the radius rod. The radius rod is securely clamped between the parts 62 and 63 by bolts 65 and 66.

As in the other embodiment of the invention corrugated washers 67 are preferably interposed between the discs and also between the outer discs and the nuts carried by the clamping bolts.

It will be observed that the described constructions make provision for the front axle to rock freely or to move bodily in a transverse vertical plane, so that the flexibility of the front spring may be availed of in cushioning the vehicle against shock due to inequalities of the road.

Although certain specific embodiments of the invention have been particularly illustrated and described it will be understood that the invention is capable of modification and that further changes in the construction and in the arrangement of the various cooperating parts may be made without departing from the spirit or scope of the invention as expressed in the following claims.

What I claim is:

1. A motor vehicle comprising a frame, a wheel axle, a radius rod having two ends connected to the axle and having an intermediate portion flexibly connected to a part rigidly carried by the frame, said connection including a link of flexible, non-metallic material, secured to said radius rod and to said part carried by the frame, and arranged to permit substantially free vertical shifting and tilting of the axle but to confine fore and aft movements of the axle within narrow limits.

2. In a motor vehicle, a frame, a motor casing carried thereby, a wheel axle and a V-shaped radius rod secured at its ends to said axle and intermediate its ends to the motor casing, the connection to the motor casing comprising a flexible, non-metallic link secured at a pair of points to said casing and at intermediate points to the radius rod, said link being disposed to permit vertical tilting and bodily movement of the axle by flexure of the link and to substantially prevent horizontal rocking or bodily movement of the axle.

3. In a motor vehicle, a frame, a motor casing carried thereby, a wheel axle and a V-shaped radius rod secured at its ends to said axle and intermediate its ends to the motor casing, the connection to the motor casing comprising a flexible, non-metallic link, rigidly secured at a pair of points to said casing and at intermediate points to the radius rod, said link being disposed to permit vertical tilting and bodily movement of the axle by flexure of the link and to substantially prevent horizontal rocking or bodily movement of the axle.

4. In a motor vehicle, a frame, a motor casing carried thereby, a wheel axle and a V-shaped radius rod secured at its ends to said axle and intermediate its ends to the motor casing, the connection to the motor casing comprising a flexible, non-metallic disk, rigidly secured at a pair of diametrically opposite points to said casing and at intermediae points to the radius rod, said link being disposed to permit vertical tilting and bodily movement of the axle by flexure of the link and to substantially prevent horizontal rocking or bodily movement of the axle.

5. In a motor vehicle, a frame including a pair of longitudinally disposed frame members, a member rigidly secured thereto and disposed therebetween, an axle secured to the frame members, a V-shaped radius rod secured at its ends to the axle and intermediate its ends to the member intermediate the frame members, the connection comprising a disk of flexible non-metallic material rigidly clamped at diametrically opposite points to the rod and at intermediate points to said member carried by the frame, said link being disposed to permit vertical tilting and bodily movement of the axle by flexure of the link and to substantially prevent horizontal rocking or bodily movement of the axle.

6. In combination, a motor vehicle frame, including longitudinal frame members, an axle carried thereby, an element secured to and disposed intermediate the frame members, a bracket mounted on said element, a radius rod connected at its ends to said axle and a connection between said rod and said bracket comprising a horizontally disposed link of material substantially inflexible in the plane thereof but freely flexible transversely of such plane, rigidly clamped to said rod and to said bracket along crossing axes, to permit substantially free vertical shifting and tilting of the axle but to confine fore and aft movements of the axle within narrow limits.

7. In combination, a motor vehicle frame including longitudinal frame members, an axle carried thereby, an element secured to and disposed intermediate the frame members, a bracket mounted on said element, a V-shaped radius rod connected at its ends to said axle and a connection between said rod and said bracket comprising a horizontally disposed link of flexible material rigidly clamped to said rod and to said bracket upon crossing axes.

8. In combination, a motor vehicle frame including longitudinal frame members, an axle carried thereby, an element secured to and disposed intermediate the frame members, a bracket mounted on said element, a radius rod connected at its ends to said axle and a connection between said rod and said bracket comprising a horizontally disposed link of flexible material highly resistant to flexure in the plane of its body, rigidly clamped to said rod and to said bracket, the link connection to the bracket crossing the connection to the radius rod.

9. A motor vehicle comprising a frame, a wheel axle, a radius rod having two ends connected to the axle and having an intermediate portion flexibly connected to a part rigidly carried by the frame, said connection including a plurality of juxtaposed links of flexible, non-metallic material, secured to said radius rod and to said part carried by the frame, and arranged to flex in directions to permit substantially free vertical shifting and tilting of the axle but to confine fore and aft movements of the axle within narrow limits 10. In a motor vehicle, a frame, a motor casing carried thereby, a wheel axle and a V-shaped radius rod secured at its ends to said axle and intermediate its ends to the motor casing, the connection to the motor casing comprising a plurality of flexible, non-metallic links disposed substantially horizontally and in substantially parallel relation and secured along transverse axes to said casing and to the radius rod, respectively.

11. In a motor vehicle, a frame, a motor casing carried thereby, a wheel axle and a V-shaped radius rod secured at its ends to said axle and intermediate its ends to the motor casing, the connection to the motor casing comprising a plurality of flexible, non-metallic disks, rigidly secured at a pair of diametrically opposite points to said casing and at intermediate points to the radius rod, the disks being disposed to permit vertical movements of the axle but to confine horizontal movements thereof within narrow limits.

12. In a motor vehicle, a frame, a motor casing carried thereby, a wheel axle, a radius rod secured at its ends to said axle, and a connection between said motor casing and said radius rod comprising a plurality of flexible, non-resilient, substantially horizontal links, means for rigidly securing said links to said motor casing, and a second means for rigidly securing said links to said radius rod, the points at which said links are secured to said casing and radius rod being spaced from each other to provide unclamped portions of the links of such extent as to permit of universal motion between the first and second means, the motion in the plane of the links being narrowly confined by them.

13. In a motor vehicle, a frame connected member, a radius rod, and a connection between said radius rod and frame connected member, said connection comprising a flexible, non-resilient link, and means for rigidly attaching said link to the frame member and rod, respectively, said points of attachment being spaced from each other to provide unclamped portions of the link capable of permitting universal movement between said rod and frame member, the link being so disposed, however, that relative horizontal movements are cushioned and narrowly confined.

In witness whereof, I have hereunto set my hand this 18 day of July, 1923.

HARVEY W. BELL.